United States Patent
Fiske et al.

(10) Patent No.: US 9,824,228 B2
(45) Date of Patent: *Nov. 21, 2017

(54) PRESERVING REDUNDANCY IN DATA DEDUPLICATION SYSTEMS BY ENCRYPTION

(71) Applicant: INTERNATIONAL BUSINESS MACHINES CORPORATION, Armonk, NY (US)

(72) Inventors: Rahul M. Fiske, Pune (IN); Carl E. Jones, Tucson, AZ (US); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,105

(22) Filed: Feb. 9, 2015

(65) Prior Publication Data

US 2015/0154411 A1    Jun. 4, 2015

Related U.S. Application Data (63) Continuation of application No. 13/801,502, filed on Mar. 13, 2013, now Pat. No. 8,990,581, which is a
(Continued)

(51) Int. Cl.
*G06F 11/30* (2006.01)
*G06F 21/60* (2013.01)
(Continued)

(52) U.S. Cl.
CPC ............ *G06F 21/604* (2013.01); *G06F 3/067* (2013.01); *G06F 3/0608* (2013.01);
(Continued)

(58) Field of Classification Search
CPC ..................................................... G06F 21/604
(Continued)

(56) References Cited

U.S. PATENT DOCUMENTS

| 7,567,188 B1 | 7/2009 | Anglin et al. |
| 7,818,495 B2 | 10/2010 | Tanaka et al. |

(Continued)

FOREIGN PATENT DOCUMENTS

| CN | 1341240 A | 3/2002 |
| CN | 101656720 A | 2/2010 |

(Continued)

OTHER PUBLICATIONS

Gu Yu et al., "Reliability Provision Mechanism for Large-Scale De-duplication Storage Systems," J Tsinghua Univ (Sci & Tech), ISSN 1000-0054, vol. 50, No. 5, pp. 739-744, 2010.

(Continued)

*Primary Examiner* — Peter Shaw
(74) *Attorney, Agent, or Firm* — Griffiths & Seaton PLLC (57) ABSTRACT

A system and non-transitory computer program product for preserving data redundancy in a data deduplication system in a computing environment is provided. A selected data segment, to be written through the data deduplication system, is encrypted such that the selected data segment is not subject to a deduplication operation. Copies of the data segment that are to be precluded from data deduplication are determined and identified. A unique encryption key is used to encrypt the selected data segment to be written through the data deduplication system such that the selected data segment is not subject to a deduplication operation. The data deduplication system is tricked to recognize the encrypted, selected data segment as new, undeduplicated data by the encrypting thereby skipping steps of the deduplication operation that includes fingerprint generation and matching.

(Continued)

The encrypted, selected data segment is directly written to a new physical storage location.

18 Claims, 6 Drawing Sheets

Related U.S. Application Data continuation of application No. 13/453,259, filed on Apr. 23, 2012, now Pat. No. 8,996,881.

(51) Int. Cl.
*G06F 3/06* (2006.01)
*G06F 17/30* (2006.01)

(52) U.S. Cl.
CPC .......... *G06F 3/0623* (2013.01); *G06F 3/0641* (2013.01); *G06F 17/30156* (2013.01); *G06F 21/602* (2013.01)

(58) Field of Classification Search
USPC ....................................................... 713/189
See application file for complete search history.

(56) References Cited

U.S. PATENT DOCUMENTS

| | | | |
|---|---|---|---|
| 7,908,436 B1 | 3/2011 | Srinivasan et al. | |
| 8,074,049 B2 | 12/2011 | Gelson et al. | |
| 8,086,799 B2 | 12/2011 | Mondal et al. | |
| 8,117,464 B1 | 2/2012 | Kogelnik | |
| 8,468,138 B1 | 6/2013 | Chhaunker et al. | |
| 8,527,544 B1 | 9/2013 | Colgrove et al. | |
| 8,539,148 B1 | 9/2013 | Chen et al. | |
| 8,589,640 B2 | 11/2013 | Colgrove et al. | |
| 8,660,994 B2 | 2/2014 | Slater et al. | |
| 8,712,976 B1 | 4/2014 | Chen et al. | |
| 9,058,118 B1* | 6/2015 | Urkude | G06F 9/45558 |
| 2003/0115447 A1* | 6/2003 | Pham | H04L 63/0428 |
| | | | 713/153 |
| 2003/0225800 A1 | 12/2003 | Kavuri | |
| 2004/0111625 A1* | 6/2004 | Duffy | G06K 9/00087 |
| | | | 713/186 |
| 2004/0131182 A1 | 7/2004 | Rogaway | |
| 2006/0179489 A1* | 8/2006 | Mas Ribes | H04N 5/913 |
| | | | 726/27 |
| 2006/0230076 A1 | 10/2006 | Gounares et al. | |
| 2007/0168350 A1 | 7/2007 | Utiger | |
| 2008/0098083 A1 | 4/2008 | Shergill et al. | |
| 2008/0244172 A1 | 10/2008 | Kano | |
| 2009/0063795 A1 | 3/2009 | Yueh | |
| 2009/0063883 A1 | 3/2009 | Mori | |
| 2009/0268903 A1 | 10/2009 | Bojinov et al. | |
| 2009/0271402 A1 | 10/2009 | Srinivasan et al. | |
| 2009/0319585 A1 | 12/2009 | Gokhale | |
| 2009/0319772 A1* | 12/2009 | Singh | G06F 21/6218 |
| | | | 713/153 |
| 2010/0037118 A1 | 2/2010 | Saliba et al. | |
| 2010/0070478 A1 | 3/2010 | Anglin | |
| 2010/0070715 A1 | 3/2010 | Waltermann et al. | |
| 2010/0121825 A1 | 5/2010 | Bates et al. | |
| 2010/0250501 A1 | 9/2010 | Mandagere et al. | |
| 2010/0250549 A1 | 9/2010 | Muller et al. | |
| 2010/0268960 A1* | 10/2010 | Moffat | H04L 9/0643 |
| | | | 713/181 |
| 2010/0299311 A1 | 11/2010 | Anglin et al. | |
| 2010/0306412 A1* | 12/2010 | Therrien | H03M 7/3084 |
| | | | 709/247 |
| 2010/0313036 A1 | 12/2010 | Lumb | |
| 2010/0313040 A1 | 12/2010 | Lumb | |
| 2010/0333116 A1 | 12/2010 | Prahlad et al. | |
| 2011/0022718 A1 | 1/2011 | Evans et al. | |
| 2011/0029739 A1 | 2/2011 | Nakajima et al. | |
| 2011/0035541 A1 | 2/2011 | Tanaka et al. | |
| 2011/0066628 A1 | 3/2011 | Jayaraman | |
| 2011/0145207 A1 | 6/2011 | Agrawal et al. | |
| 2011/0145576 A1 | 6/2011 | Bettan | |
| 2011/0225130 A1 | 9/2011 | Tokoro | |
| 2011/0225214 A1 | 9/2011 | Guo | |
| 2011/0238634 A1 | 9/2011 | Kobara | |
| 2011/0238635 A1 | 9/2011 | Leppard | |
| 2011/0239097 A1 | 9/2011 | Bates et al. | |
| 2011/0258398 A1 | 10/2011 | Saliba et al. | |
| 2012/0017043 A1 | 1/2012 | Aizman et al. | |
| 2012/0072654 A1 | 3/2012 | Olbrich et al. | |
| 2012/0089574 A1 | 4/2012 | Doerner | |
| 2012/0095968 A1 | 4/2012 | Gold | |
| 2012/0158672 A1 | 6/2012 | Oltean et al. | |
| 2012/0317084 A1 | 12/2012 | Liu | |
| 2013/0086006 A1 | 4/2013 | Colgrove et al. | |
| 2013/0097380 A1 | 4/2013 | Colgrove et al. | |
| 2013/0144846 A1 | 6/2013 | Chhaunker et al. | |
| 2013/0198742 A1 | 8/2013 | Kumar et al. | |
| 2013/0262404 A1 | 10/2013 | Daga et al. | |
| 2013/0262753 A1 | 10/2013 | Prins et al. | |

FOREIGN PATENT DOCUMENTS

| | | |
|---|---|---|
| CN | 201110156839 A | 6/2011 |
| CN | 102156727 A | 8/2011 |
| CN | 102221982 A | 10/2011 |
| CN | 102281320 A | 12/2011 |
| JP | 2006308636 A | 11/2006 |
| WO | 2011033582 A1 | 3/2011 |

OTHER PUBLICATIONS

Wang et al., "Research on Secure De-duplication based on Proxy-Recreation," Sciencepaper Online, pp. 1-6, Dec. 27, 2011.

* cited by examiner

PRESERVING REDUNDANCY IN DATA DEDUPLICATION SYSTEMS BY ENCRYPTION

CROSS REFERENCE TO RELATED APPLICATIONS

This application is a Continuation of U.S. patent application Ser. No. 13/801,502, filed on Mar. 13, 2013, which is a Continuation of U.S. patent application Ser. No. 13/453,259, filed on Apr. 23, 2012.

FIELD OF THE INVENTION

The present invention relates in general to computers, and more particularly to a method, system, and computer program product for preserving redundancy and other data security characteristics in computing environments in which data deduplication systems are incorporated.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Many multi-tiered/multi-system computing environments implement data deduplication technologies to improve storage performance by reducing the amount of duplicated storage across storage devices. Data deduplication systems are increasingly utilized because they help reduce the total amount of physical storage that is required to store data. This reduction is accomplished by ensuring that duplicate data is not stored multiple times. Instead, for example, if a chunk of data matches with an already stored chunk of data, a pointer to the original data is stored in the virtual storage map instead of allocating new physical storage space for the new chunk of data.

In certain situations, however, the behavior of deduplication may go against the redundancy requirements of a hosted application, for example, or a storage policy, or other requirements. A need exists for a mechanism whereby data having redundancy requirements is safeguarded, yet the benefits of deduplication systems are not diminished, by allowing deduplication to occur for remaining data not having such requirements.

In view of the foregoing, various embodiments for preserving data redundancy in data deduplication systems are disclosed. In one embodiment, by way of example only, a system and non-transitory computer program product for such preservation is disclosed. A selected data segment, to be written through the data deduplication system, is encrypted such that the selected data segment is not subject to a deduplication operation.

In one embodiment, by way of example only, system and non-transitory computer program product for preserving data redundancy in a data deduplication system in a computing environment is provided. A selected data segment, to be written through the data deduplication system, is encrypted such that the selected data segment is not subject to a deduplication operation. Copies of the data segment that are to be precluded from data deduplication are determined and identified. A unique encryption key is used to encrypt the selected data segment to be written through the data deduplication system such that the selected data segment is not subject to a deduplication operation. The data deduplication system is tricked to recognize the encrypted, selected data segment as new, undeduplicated data by the encrypting thereby skipping steps of the deduplication operation that includes fingerprint generation and matching. The encrypted, selected data segment is directly written to a new physical storage location.

In addition to the foregoing exemplary system and non-transitory computer program product embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Data deduplication in storage controllers typically works "behind the scene" of an application, and may sometimes operate contrary to the interests of the application when deduplication operations are performed against the needs of the application. This situation may arise if an application writes multiple copies of the same data, and intends to retain multiple physical copies, while the deduplication subsystem (deduplication engine) finds these matching copies and ends up deduplicating the copies while storing the data. This can be detrimental to the application, which expects to find multiple copies at various locations, and is made to believe that it has done so by the storage subsystem, but in reality only a single copy of the data has been written.

Consider the following example. File systems usually prefer to write multiple physical copies of the "Superblock," or a segment of metadata describing the file system on a block-based storage device, (or other metadata information) on a virtual disk to ensure redundancy. Since the contents of the Superblock are the same, data deduplication would result in retaining a single, physical copy of the Superblock and point multiple virtual addresses to the same physical block. This situation is highly inadvisable, because the loss of a single block on the physical copy of the Superblock may render the file system totally unusable, as there are no redundant copies of the Superblock. Conventionally, there are no existing methodologies that directly address this problem in data deduplication systems.

Various indirect methodologies may be employed to attempt to address this problem. In one example, the storage pool from which the data deduplication subsystem carves out physical storage can be mirrored (i.e., contains 2 or 3 copies of the same data). Hence multiple redundant copies can be created despite deduplication. However, this is inadequate protection for the application because of the following reasons. First, the application may wish to keep, for example, ten (10) copies of the same data. However, if the storage pool is two-way mirrored, it may only retain a maximum of two (2) copies. Second, since data deduplication carves out physical storage pools that span across large amounts of storage and multiple file systems, it is likely that multiple applications and file systems share the same physical storage pool. Hence it is possible that some critical copies of data (like the Superblock) get physically placed on the same disk. Since deduplication would prevent multiple copies of the same data to be written to multiple physical locations, the number of copies of critical data reduces and they can get placed on the same physical disk for multiple file systems. This increases the risk of single failures becoming fatal.

The illustrated embodiments provide multiple mechanisms for addressing the issues discussed previously. One goal of these mechanisms is to ensure that the deduplication subsystem in the storage controller (or wherever it may be located) balances the benefits of reducing the number of copies of data against application requirements for physical allocating multiple copies of critical data. Each of the methodologies described in the following illustrated embodiments may be used in a variety of circumstances and may have attendant benefits specific to those circumstances.

In one such embodiment, a selected data segment (such as a block) may be encrypted by an owning application, thereby "tricking" the data deduplication system into thinking that the selected data is new, unduplicated data and must be allocated to new storage space. For example, for data blocks where an owning application must store multiple physical copies of identical data, the application may encrypt the data with the start Logical Block Address (LBA) of the data block (or, alternatively, some other well-known key for the data block that would not require additional metadata storage space, such as the copy number (e.g., the first copy is encrypted with the key 1, the second with key 2, etc.)). Encryption of identical copies with differing keys will render the copies "different" to the eyes of an examining deduplication engine, thus ensuring that a storage controller or other storage management device incorporating the deduplication engine will not deduplicate the blocks.

The encryption technique mentioned above has an advantage in that a storage controller (or again, any storage management device) need not change anything to implement the desired characteristics. The owning application again "tricks" or "fools" the storage controller by using a simple technique and does so without incurring extra overhead or significant processing or resource allocation (e.g., additional metadata storage overhead, but preserving additional resources as one of ordinary skill in the art will appreciate).

In view of the described embodiment, by allowing the application to dictate whether a write must be encrypted (and thereby deciding which data to forgo deduplication), the application is allowed flexibility to implement storage policy associated with the data it generates. This way, the application is in a better position than the deduplication system to determine whether selected data blocks, even though identical, must still be located in separate physical locations. In addition, the storage controller (or other storage management device) continues to perform its role of data reduction by deduplication, and at the same time allowed enough control to the application to rule out deduplication when required.

By designating selected data chunks as encrypted, very fine-grained control is thereby provided to the application, allowing for flexibility in implementation while still retaining advantages of deduplication functionality and retaining redundancy for key data.

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
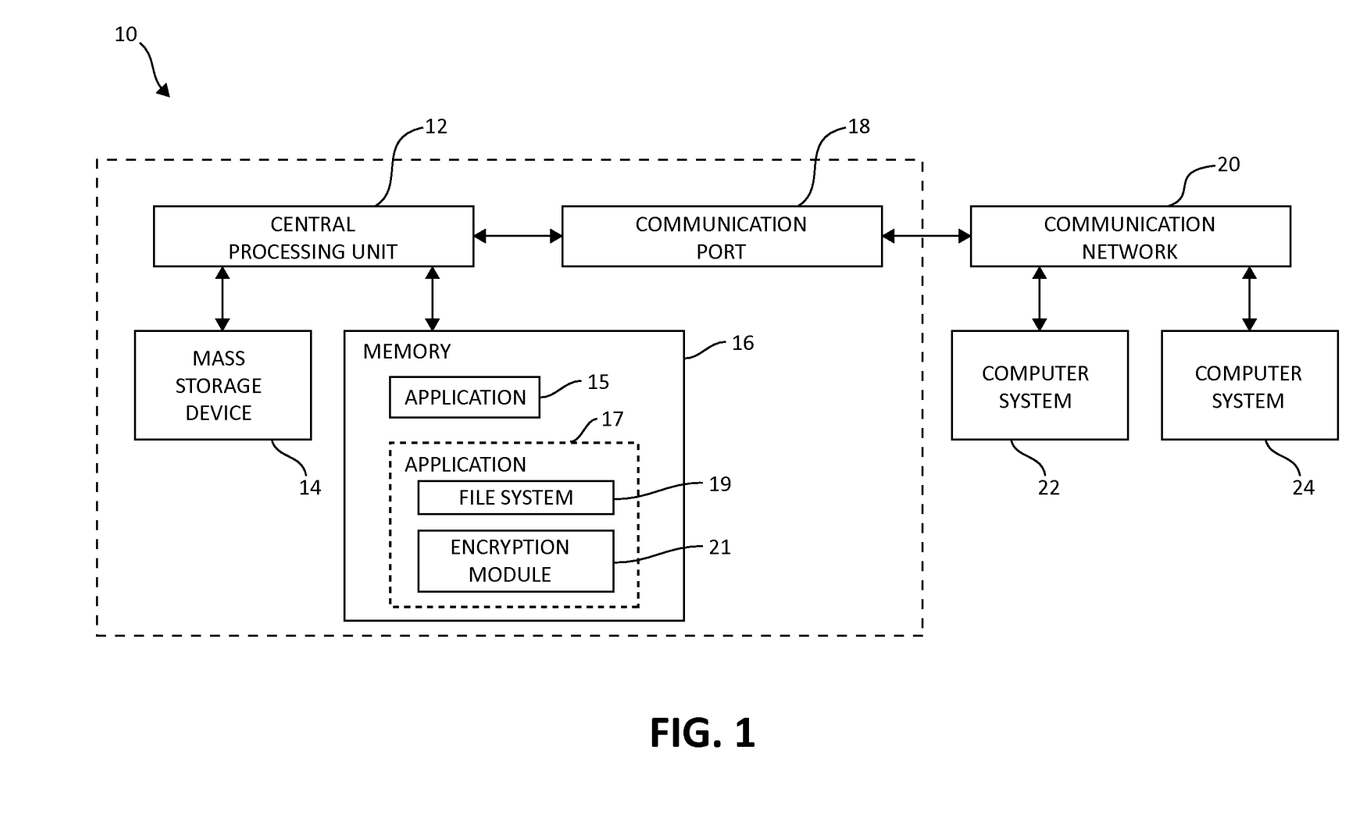
FIG. 1 is a block diagram illustrating an exemplary computing environment which may implement aspects of the present invention.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The data management operations, in which aspects of the present invention may be implemented as further described, may be executed on device(s) 14, located in system 10 or elsewhere. Memory device 16 may include such memory as electrically erasable programmable read only memory (EEPROM) or a host of related devices.

Memory 16 is shown including an application program 15, and an application program 17, in which a file system 19 is operational as well as an encryption module 21. Application 15 and application 17 may create, delete, or otherwise manage segments of data, such as data chunks or data blocks, which are physically stored in devices such as mass storage device 14. File system 19 provides a means to organize data expected to be retained after the application program 17 terminates by providing procedures to store, retrieve, and update data, as well as manage the available space on the device(s) that contain it. The file system 19 organizes data in an efficient manner, and is tuned to the specific characteristics of the device (such as computer 10 and/or memory 16). In one embodiment, application 17 may be an operating system (OS) 17, and file system 19 retains a tight coupling between the OS 17 and the file system 19. File system 19 may provide mechanisms to control access to the data and metadata, and may contain mechanisms to ensure data reliability such as those necessary to further certain aspects of the present invention, as one of ordinary skill in the art will appreciate. File system 19 may provide a means for multiple application programs 15, 17 to update data in the same file at nearly the same time.

Encryption module 21 may be used in conjunction with the application 15, application 17, the file system 19, or other computing hardware or software components to accomplish purposes of the present invention. In one embodiment, for example, encryption module 21 processes selected data chunks designated to forgo deduplication to encrypt at least a portion of the data chunk with a weak security key (again to avoid incurring significant processing and/or resource allocation overhead). Implementation of the encryption mechanism may vary, as one of ordinary skill in the art will appreciate, and the encryption mechanism itself may vary according to a particular implementation. In one embodiment, a goal of the encryption mechanism is to "change" the character of the data just enough for the deduplication engine to think that the data is "new" data, while requiring the least amount of resource and overhead allocation as possible.

In the illustrated embodiment, memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
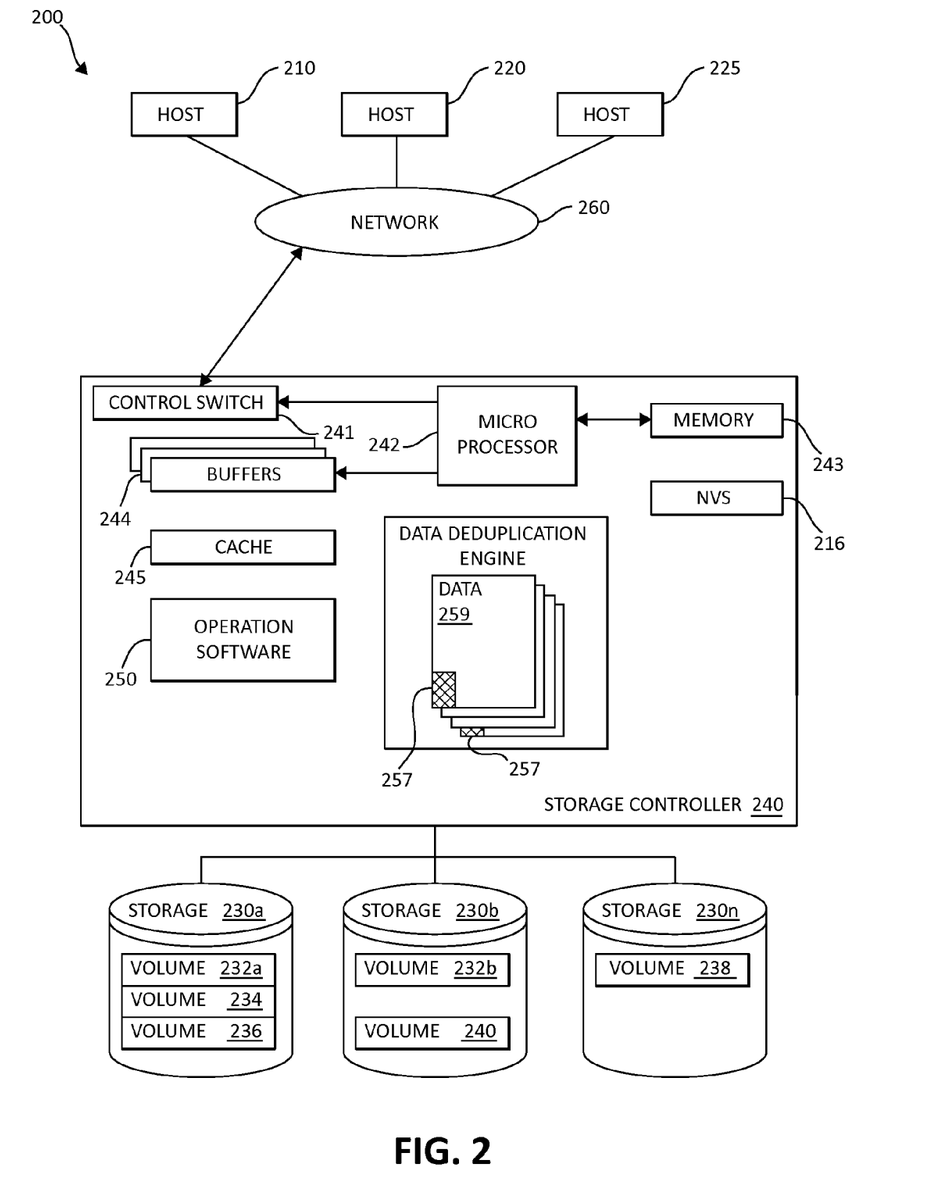
FIG. 2 is a block diagram showing a hardware structure of a data storage system, again in which aspects of the present invention may be implemented.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data that the processor 242 may access for executing functions associated with managing storage 230. In one embodiment, system memory 243 includes, is associated, or is in communication with the operation software 250, and configured in part for accomplishing functionality of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and compression operation module 255 and compression operation list module 257 in which information may be set. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, compression operation module 255 and compression operation list module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

The storage controller 240 is shown including a data deduplication engine 255, in which a number of write data 259 is processed. The data deduplication engine 255 may be structurally one complete module or may be associated and/or incorporated within other individual modules. Data deduplication engine 255 is configured for performing, in conjunction with other components of storage controller 240 such as microprocessor 242, data deduplication operations on write data 259 passed through storage controller 240 to storage 230.

As previously indicated, storage controller 240 includes cache 245 (or what may be termed holistically as cache system) 245 accepts write data from hosts 210, 220, and 225, or similar devices, that is then placed in cache memory 245. Data deduplication engine 255 then tests the write data for duplication in the cache memory 245. The write data 259 that the application 17 (FIG. 1) desires to protect from deduplication operations are encrypted with encryption keys 257 as shown (encrypted data 257). Those of the write data 259 having encryption keys 257 that are passed through the data deduplication engine 255 designate to the data deduplication engine 255 that they are "new" data, and thereby not subject to a deduplication operation (e.g., replaced with a pointer to existing data already placed in storage 230).

In one embodiment, the application 17/file system 19 first determines whether a given data block must be stored multiple times on physical storage. This may be Superblock metadata associated with the file system 19 itself, or other relevant file system information, for example. The application 17 then encrypts those data blocks with a unique key for that virtual device before a write is issued. As a following step, the application may initiate a write request to the underlying disk (device) driver, along with the encrypted data 257, in effect designating that this data block is "new" and must not be deduplicated, even if the unencrypted block is identical to a previously written data block. Encryption may be performed by the owning application on a per-disk-block basis using the LBA of that block as the weak encryption key.

Here again, the selected encryption method (including encryption key) chosen such that the key is simple to deduce when it is later read back from the underlying storage controller or storage management device. Examples of encryption keys may include the following: (1) the start LBA of the selected data block; (2) the offset of the data block within the file; and other similar encryption mechanisms that one of ordinary skill in the art would be familiar. The encryption key should be weak and predictable (i.e., the owning application will know, without storing the key anywhere, what the encryption key for a specific meta-block would be).

In a following step, the disk driver in turn prepares a write command, such as a Small Computer Systems Interface (SCSI) command to the storage controller 240. On receiving the designated, encrypted data block, the storage controller 240, via data deduplication engine 255, skips the deduplication steps of fingerprint generation, matching, etc., as one of ordinary skill in the art will appreciate, and directly writes the selected data block onto a new physical disk location, even if there may have been earlier instances of identical data being stored on the storage controller 240. Later, on a subsequent read of these data blocks (well known to the application), the application decrypts the data using the well-known and simple key (e.g., weak key/encryption mechanism). Since the encryption techniques used herein are not necessarily for data security, any overhead for performing such techniques may be efficiently minimized as much as possible.

In a preferred embodiment, an encryption or data transformation function should be chosen such that the size of the resultant data remains unaltered. For example, in a situation where 512 bytes of data are to be transformed, 512 bytes of resultant encrypted data are produced.

In one embodiment, the owning application may choose to encrypt multiple blocks of data written as a unit. The data transformation function (encryption function) should be such that decrypting each individual block returns the original data for this block. Alternatively, the application should read these multi-block units as chunks of data and decrypt them as a unit.

Figure 3:
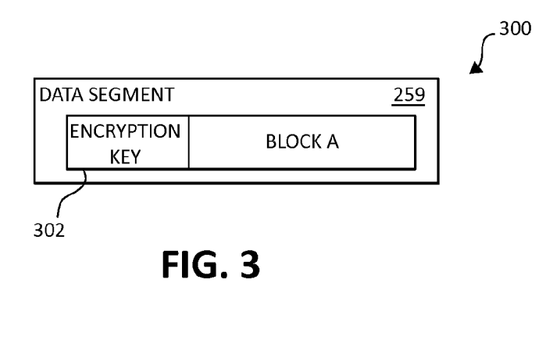
FIG. 3 is a block diagram of an exemplary data segment, in which aspects of the present invention may be implemented.

Turning now to FIG. 3, a block diagram 300 of an exemplary data segment 259 (i.e., block) is illustrated, in which various aspects of the illustrated embodiments may be incorporated. Data segment 259 includes a weak encryption key 302 (such as the present copy-1, 2, 3, and so on), which is appended to a portion of block A as shown.

Figure 4A:
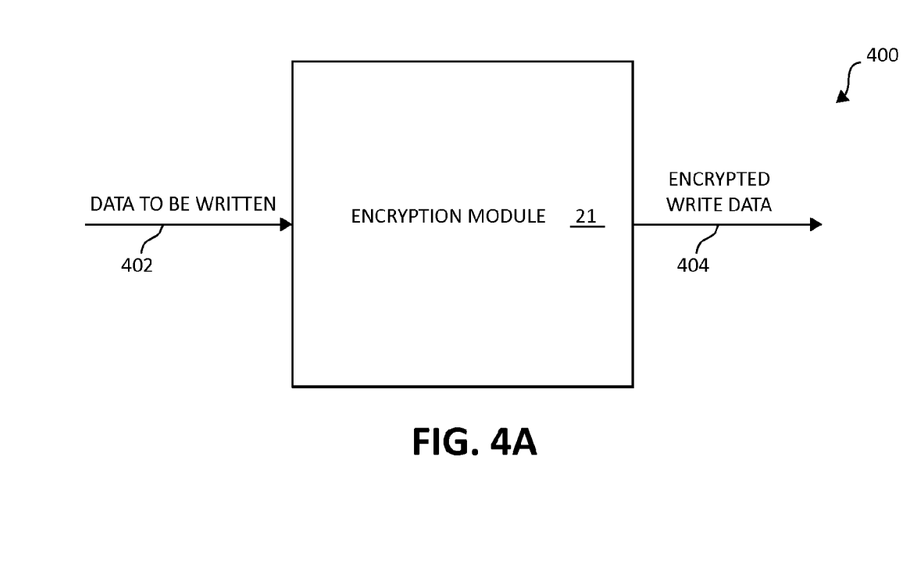
FIG. 4A is a block diagram of an exemplary process of writing data through an encryption module to obtain encrypted write data.

FIG. 4A illustrates a block diagram 400 of various functional aspects of the present invention as depicted as an exemplary flow. Specifically, data to be written 402 through the data deduplication engine yet not processed with any deduplication operations are first, before a write command is issued to the storage controller, passed through the encryption module 21 (FIG. 1), where a weak encryption is applied to the selected data and generate encrypted write data 404 as shown.

Figure 4B:
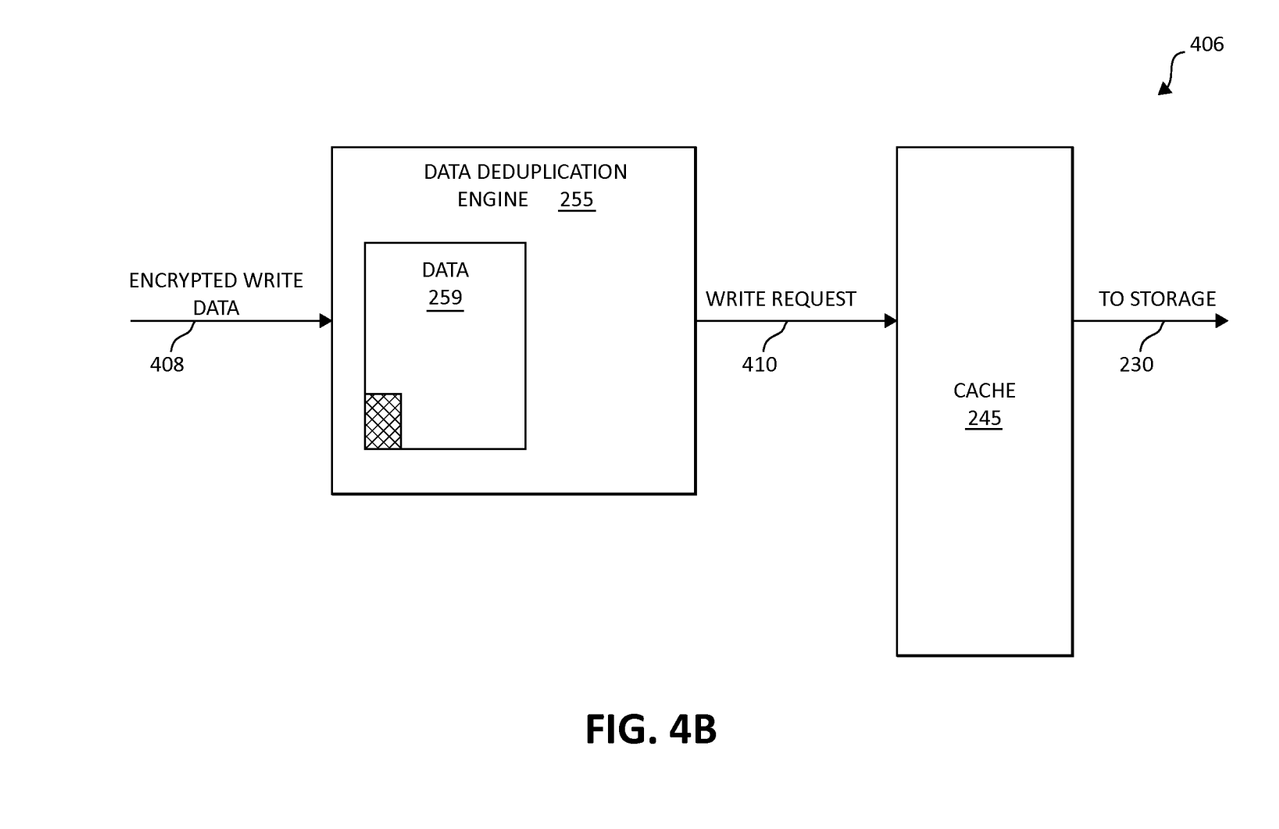
FIG. 4B is a related block diagram of an exemplary process of writing encrypted write data through a data deduplication engine and cache to physical storage.

Continuing with FIG. 4B, block diagram 406 illustrates additional various functional aspects of the present invention, again as depicted as an exemplary flow. Specifically, the encrypted write data 408 is passed to the storage controller to be written to storage 230 (again, FIG. 2). The encrypted write data is passed through the data deduplication engine 255 as shown, where the encrypted data 259 is thought to be new data versus existing, potentially duplicate data. As such, the data deduplication engine passes the encrypted data in conjunction with the write request 410 to other portions of the storage controller, such as the cache system 245, and new space in storage 230 is allocated for the encrypted data, where it is ultimately written.

Figure 5:
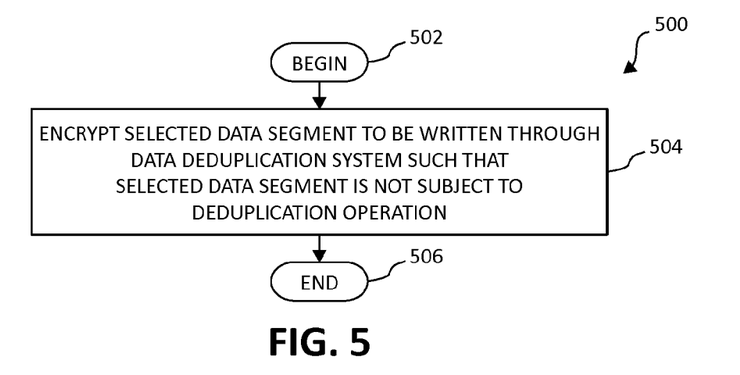
FIG. 5 is an exemplary method for ensuring redundancy in data deduplication systems according to the present invention.

With the foregoing in view, FIG. 5, following, is an exemplary method 500 for ensuring data redundancy in storage subsystems having data deduplication systems, in which aspects of the illustrated embodiments may be implemented. Method 500 begins (step 502) with the encryption of a selected data segment to be written through the data deduplication system such that the selected data segment is not subject to a deduplication operation (step 504). The method 500 then ends (step 506).

Figure 6:
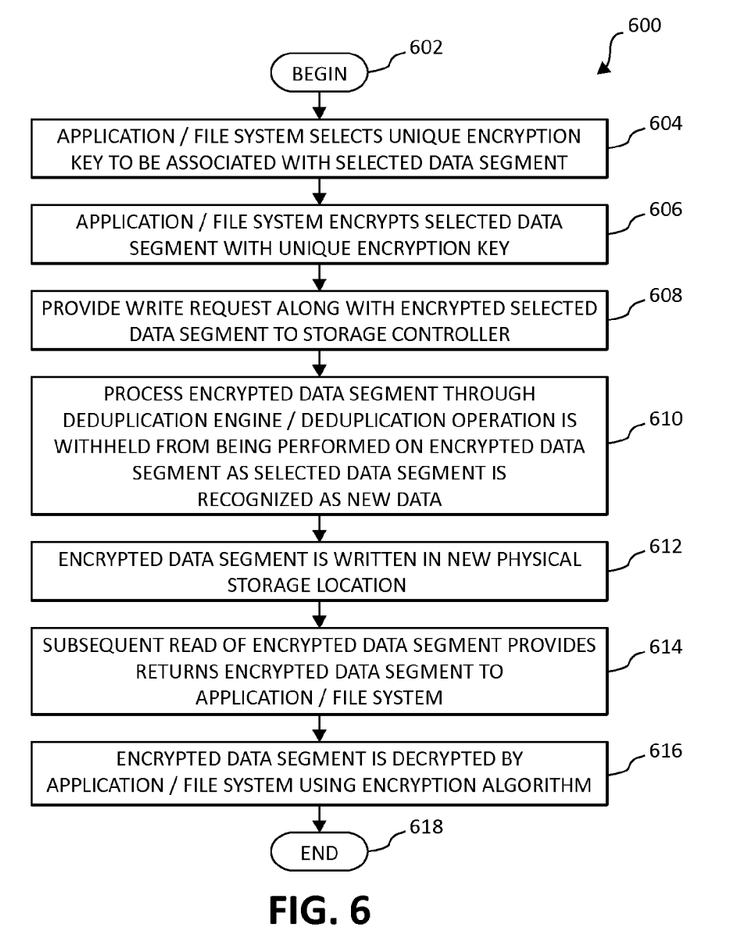
FIG. 6 is an exemplary method for processing data in which aspects of the present invention may be implemented.

In FIG. 6, following, an exemplary method 600 for data processing is illustrated, here again in which various aspects of the present invention may be implemented. Method 600 begins (step 602), with the selection of a unique encryption key by the owning application to be associated with a data segment chosen by the owning application to forgo deduplication (step 604). The owning application and/or file system then encrypts the selected data segment with the unique encryption key (step 606).

As a following step, a write request, along with the encrypted, selected data segment, is provided to the storage controller (step 608). The encrypted data segment is then processed through the deduplication engine, whereupon a deduplication operation is withheld from being performed on the encrypted data as the selected data segment is recognized/treated by the deduplication engine as "new" data (step 610).

In step 612, the encrypted data segment is written in a newly allocated physical storage location. In a later, subsequent read of the encrypted data, the encrypted data is then returned to the owning application and/or file system (step 614). Then, the encrypted data segment is decrypted by the application and/or file system using the affiliated encryption algorithm (step 616), which again, as one of ordinary skill in the art will appreciate, may vary according to a particular application but may be selected to minimize overhead and bandwidth. The method 600 then ends (step 618).

Figure 7:
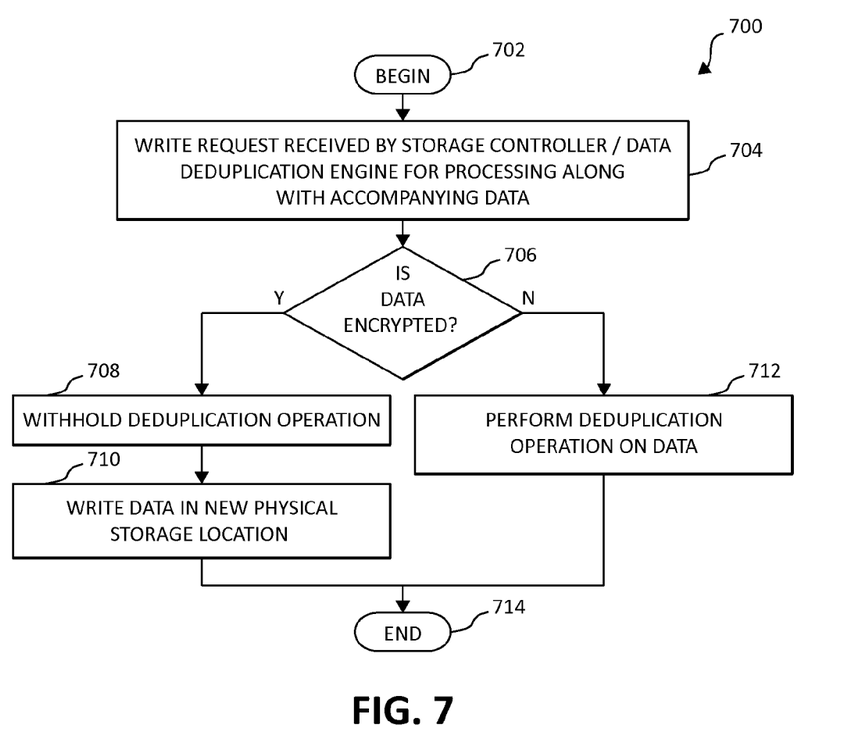
FIG. 7 is an additional exemplary method for processing data, again in which aspects of the present invention may be implemented.

FIG. 7, following, is a related exemplary method 700 for processing data, here again incorporating various aspects of the present invention. Method 700 begins (step 702) with a write request being received by the storage controller/data deduplication engine for processing along with accompanying data to be written (step 704).

In step 706, the method 700 queries whether the accompanying data is encrypted (step 706). If so, the deduplication engine/storage controller forgoes performing data deduplication operations (step 708), and the encrypted data is written in a newly allocated physical storage location (step 710). Note, for purposes of illustration, the "method" 700 is said to query whether the data is encrypted. In actuality, however, the data deduplication system does not understand, and does not query, whether the data is encrypted or not. As previously explained, by virtue of encryption, the data block will not match with its duplicate copy previously written by the owning application. Hence, the deduplication system will treat this as a "new" data block, and will write the block to physical storage. Returning to step 706, if the accompanying data is not encrypted, then the deduplication engine/storage controller performs various deduplication operations on the data (step 712). The method 700 then ends (step 714).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for preserving data redundancy in a data deduplication system in a computing environment, comprising: at least one processor device implemented in computing hardware; a file system module controlled by the processor device; and a storage controller, controlled by the at least one processor, in operable communication with the file system module, wherein: for adhering to requirements of an application for allocating a plurality of copies of a selected data segment to a plurality of physical storage locations, the file system module is configured to: in a two-way mirrored storage pool, determine and identify the plurality of copies of the selected data segment that are to be precluded from data deduplication, the selected data segment comprising a superblock associated with a segment of metadata describing characteristics of a file system; encrypt with a unique encryption key, by the application, the selected data segment to be written through the data deduplication system such that the selected data segment is not subject to a deduplication operation, wherein the unique encryption key is a weak and predictable encryption key and does not require additional metadata storage space of the selected data segment; trick the data deduplication system to recognize the encrypted, selected data segment as new, undeduplicated data by the encrypting thereby skipping steps of the deduplication operation that includes fingerprint generation and matching, wherein the encrypted, selected data segment is not matched with identical data previously written; directly write the encrypted, selected data segment to a new physical storage location even if there are earlier instances of identical data of the encrypted, selected data segment being stored on the storage controller, system such that multiple, redundant copies of the selected data segment comprising the superblock are stored in the plurality of physical storage locations in the computing environment; wherein encrypting the selected data segment includes choosing multiple selected data segments written as a unit such that each of the multiple selected data segments are decrypted as the unit; and
   requesting the superblock of data segments and subsequently decrypting the data segments with the weak and predictable key.
2. The system of claim 1, wherein the storage controller is further configured to process the encrypted, selected data segment through the computing environment such that the deduplication operation is withheld from being performed on the selected data segment.

3. The system of claim 2, wherein the file system module is further configured to: select the unique encryption key to be associated with a data segment for a deduplication operation; and encrypt the selected data segment with the unique encryption key for an associated virtual device in advance of issuing a write request to the storage controller.

4. The system of claim 3, wherein the unique encryption key is selected to be associated with one of a start of a logical block address (LBA) for the selected data segment, and an offset of the selected data segment within a file wherein an encryption function is chosen to retain a size of the encrypted, selected data segment.

5. The system of claim 4, wherein the file system module is further configured to choose multiple selected data segments written as the unit such that decrypting each of the multiple selected data segments returns original data for each segment.

6. The system of claim 1, further including a data deduplication engine associated with the storage controller and controlled by the at least one processor; wherein the file system module is further configured to issue a write request for the encrypted, selected data segment through the data deduplication engine.

7. The system of claim 1, wherein the file system module is further configured to, on a subsequent read operation of the selected data segment, decrypt the selected data segment.

8. The system of claim 7, wherein the selected data segment is decrypted with the weak, unique, and predictable encryption key.

9. A computer program product for preserving data redundancy in a data deduplication system in a computing environment by a processor, the computer program product comprising a non-transitory computer-readable storage medium having computer-readable program code portions stored therein, the computer-readable program code portions comprising: for adhering to requirements of an application for allocating a plurality of copies of a selected data segment to a plurality of physical storage locations: a first executable portion that, in a two-way mirrored storage pool, determines and identifies the plurality of copies of the selected data segment that are to be precluded from data deduplication, the selected data segment comprising a superblock associated with a segment of metadata describing characteristics of a file system; a second executable portion that, before a write of the selected data segment is issued, encrypts with a unique encryption key, by the application, the selected data segment to be written through the data deduplication system such that the selected data segment is not subject to a deduplication operation, wherein the unique encryption key is a weak and predictable encryption and does not require additional metadata storage space of the selected data segment; a third executable portion that tricks the data deduplication system to recognize the encrypted, selected data segment as new, undeduplicated data by the encrypting thereby skipping steps of the deduplication operation that includes fingerprint generation and matching, wherein the encrypted, selected data segment is not matched with identical data previously written; a fourth executable portion that directly writes the encrypted, selected data segment to a new physical storage location even if there are earlier instances of identical data of the encrypted, selected data segment being stored on a storage controller, such that multiple, redundant copies of the selected data segment comprising the superblock are stored in the plurality of physical storage locations in the computing environment; wherein encrypting the selected data segment includes choosing multiple selected data segments written as a unit such that each of the multiple selected data segments are decrypted as the unit; and a fifth execution portion that requests the superblock of data segments and subsequently decrypts the data segments with the weak and predictable key.

10. The computer program product of claim 9, further including a fifth executable portion that processes the encrypted, selected data segment through the computing environment such that the deduplication operation is withheld from being performed on the selected data segment.

11. The computer program product of claim 10, further including a sixth executable portion that encrypts the selected data segment with the unique encryption key for an associated virtual device in advance of issuing a write request to the storage controller.

12. The computer program product of claim 11, further including a seventh executable portion that selects the encryption key to be associated with one of a start of a logical block address (LBA) for the selected data segment, and an offset of the selected data segment within a file, wherein an encryption function is chosen to retain a size of the encrypted, selected data segment processed through the encryption function.

13. The computer program product of claim 12, further including an eighth executable portion that chooses multiple selected data segments written as a unit such that decrypting each of the multiple selected data segments returns original data for each segment.

14. The computer program product of claim 10, further including a sixth executable portion that issues a write request for the encrypted, selected data segment through a deduplication engine in the storage controller.

15. The computer program product of claim 14, wherein during execution of the write request for the encrypted, selected data segment, the data deduplication engine recognizes the encrypted, selected data segment as a new segment of data and withholds performing the deduplication operation.

16. The computer program product of claim 9, further including a fifth executable portion that, on a subsequent read operation of the selected data segment, decrypts the selected data segment.

17. The computer program product of claim 16, wherein decrypting the selected data segment includes decrypting the selected data segment with the weak, unique, and predictable encryption key.

18. The computer program product of claim 9, further including a fifth executable portion that selects the unique encryption key to be associated with a data segment for a deduplication operation.

* * * * *